May 16, 1950     S. C. HETH     2,507,669
TRACTOR MOUNTED COMBINE
Filed Oct. 12, 1945     2 Sheets-Sheet 1
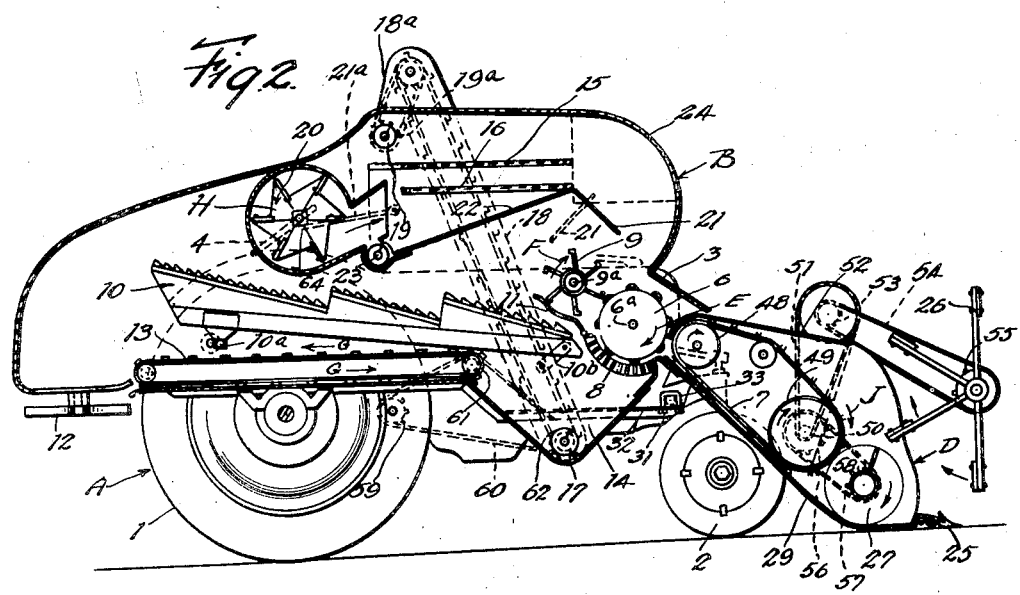
Inventor:
Sherman C. Heth
By Thiess, Olson & Mecklenburger
Attys.

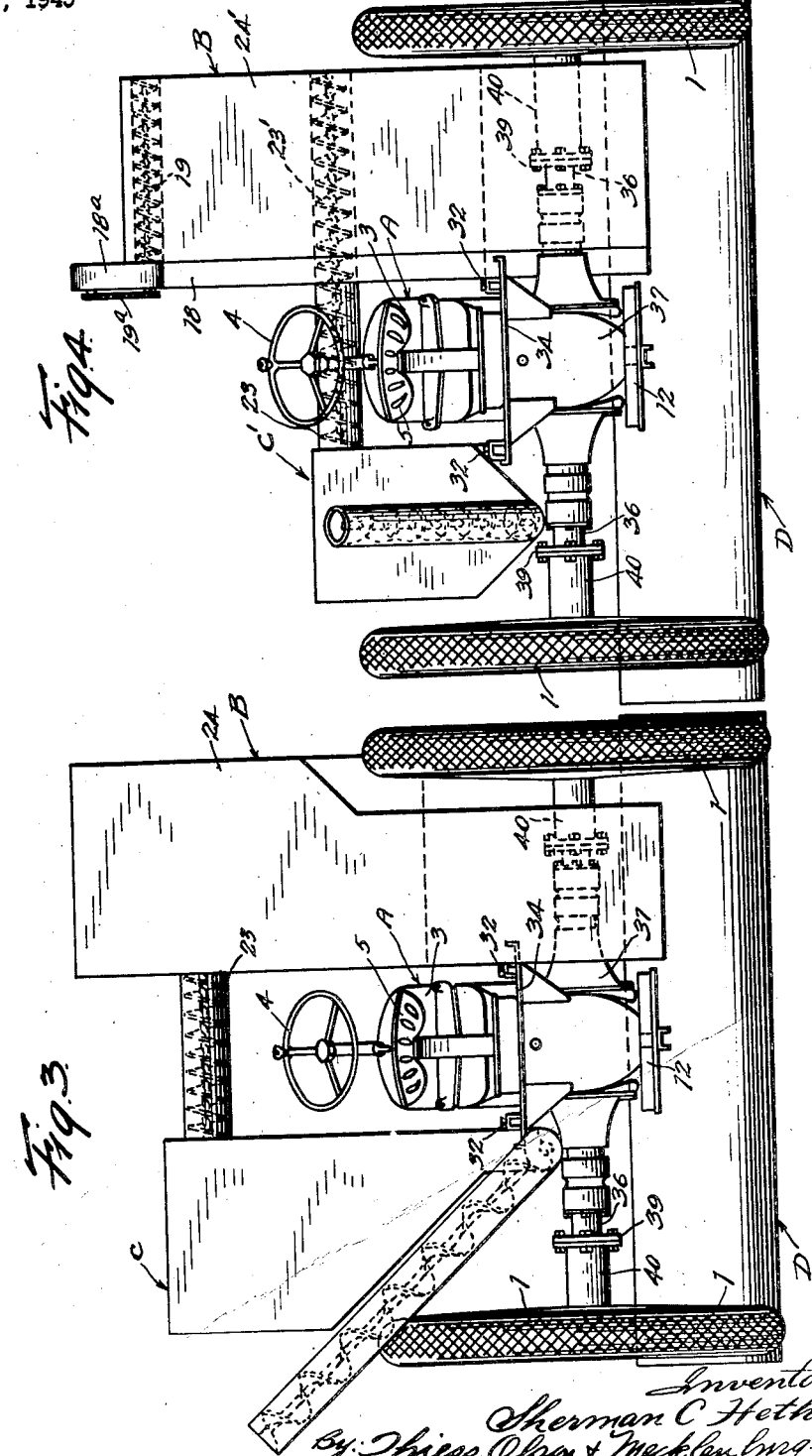

Patented May 16, 1950

2,507,669

UNITED STATES PATENT OFFICE 2,507,669

TRACTOR MOUNTED COMBINE

Sherman C. Heth, Racine, Wis., assignor to J. I. Case Company, Racine, Wis., a corporation of Wisconsin Application October 12, 1945, Serial No. 622,011

11 Claims. (Cl. 56—21)

My invention relates to tractor mounted combines.

One of the objects of my invention is to provide an improved tractor mounted combine construction in which the combine casing and parts mounted thereon and therein may be readily attached and detached with respect to a general purpose tractor.

A further object is to provide an improved tractor mounted combine which will be compact in construction.

A further object is to provide an improved tractor mounted combine in which the combine is mounted on one side of the tractor inside the drive wheel, and a grain bin is mounted on the other side of the tractor inside the drive wheel.

A further object of my invention is to provide a compact combine construction in which a single elevator lifts the grain which passes through the concave and also the broken straw and tailings which pass through the straw rack to a chaffer and cleaning sieve apparatus mounted at a higher elevation than the cylinder so that the material which does not pass through the sieves may be delivered to the cylinder to be rethreshed.

A further object of my invention is to provide an improved combine of the type indicated in which the cutter bar spans the full width of the wheels, thereby enabling the cutting of a swath through the middle of a field without mashing down any grain.

A further object of my invention is to provide an improved tractor mounted combine in which the placing of the thresher on one side of the tractor and the bin on the other side, both the thresher and the bin lying between the tractor body and the drive wheels, results in a well-balanced construction and enables the thresher and harvesting apparatus to be fitted to a tractor, such as is now in use.

A further object of my invention is to provide a threshing apparatus in which the cleaning shoe is so positioned that the fan blast goes upwardly through the shoe and then reverses its direction and travels over the straw rack.

A further object of my invention is to provide a deflector for the tailings from the cleaning shoe, adjustable so that the tailings may be directed to the cylinder to be rethreshed, or may be directed toward the straw rack, by-passing the cylinder.

Further objects and advantages of the invention will be apparent from the description and claims.

In the drawings, in which my invention is illustrated,

Figure 1 is a plan view of a tractor mounted combine, the reel and drive mechanism therefor being omitted for the sake of clarity;

Fig. 2 is a vertical section of the combine substantially on the line 2—2 of Fig. 1;

Fig. 3 is a rear elevational view of the combine on a larger scale than in Figs. 1 and 2, parts being omitted;

Fig. 4 is a rear elevational view of a somewhat modified combine provided with long hub extensions;

Fig. 5 is a side elevational view on an enlarged scale showing a detail of the combine mounting.

Referring to the drawings in detail, the tractor mounted combine shown comprises the tractor A, threshing apparatus B, mounted on the tractor on one side thereof, a storage bin C (Fig. 3) or C' (Fig. 4) to which the grain is delivered from the threshing apparatus, mounted on the other side of the tractor, and apparatus D for cutting the grain and delivering it to the thresher.

The tractor comprises the rear drive wheels 1, the dirigible front wheels 2, an engine 3 for driving the drive wheels 1, threshing apparatus B and cutting and delivering apparatus D, a steering wheel 4 for controlling the dirigible wheels, and a seat 5 for the operator.

The threshing apparatus comprises a cylinder 6 rotatable with the bearing supported shaft 6$^a$ in the direction of the arrow E, to which the cut material is delivered from the rake conveyor 7, a concave 8 co-operating with the cylinder 6 for effecting initial separation of the material delivered to the cylinder, and additional separating and advancing apparatus for further handling material delivered from the cylinder and concave.

The additional apparatus for handling the material which does not pass through the concave comprises a beater 9 rotatable with the bearing supported shaft 9$^a$ in the direction of the arrow F for receiving, deflecting and passing along the material thrown off by the cylinder 6, a rocking straw rack 10 to which the beater 9 delivers the material which it receives from the cylinder, a crankshaft 10$^a$ for rocking the straw rack 10, a rock arm 10$^b$ for supporting the front end of the straw rack, a grate 11 for guiding the straw from the cylinder 6 to the straw rack 10 and passing the grain therethrough, a rotatable straw spreader 12 for scattering the straw delivered thereto from the straw rack 5, and an endless raddle conveyor 13 movable in the direction of the arrows G for receiving broken straw and the broken grain heads which may drop through the straw rack 10, the upper run of the conveyor, carrying the longer broken straw rearwardly and delivering it to the straw spreader 12, and the lower run of the conveyor carrying the shorter broken straw and broken grain heads forwardly to the chamber 14 to be combined with the material delivered from the concave 8.

The material delivered to this chamber 14 from the concave 8 and conveyor 13 comprises broken straw, broken grain heads, chaff, and separated grain. All this material is carried upwardly and delivered to the separating sieves, including the chaffer sieve 15 and the cleaning sieve 16, where the grain is separated from the chaff and tailings, and the tailings are again delivered to the cylinder 6 to be recirculated for additional threshing and separation if desired.

The grain, chaff and tailings are delivered to the separating sieves 15 and 16 from the chamber 14 by means of a screw conveyor 17 extending across the bottom of the chamber 14, an elevator 18 which may be of the endless chain type for carrying the material upwardly, a boot 18ᵃ to which the elevator 18 delivers the material, and a screw conveyor 19 driven by the chain 19ᵃ for receiving the material from the boot 18ᵃ and distributing it across the chaffer sieve 15. This requires only one elevator in place of the usual two (one for clean grain and one for tailings), as shown, for example, in the patent to Van Sickle No. 2,129,452 of record. A fan 20 is provided, rotating in the direction of the arrow H, for forcing air upwardly and forwardly beneath and through the sieves 16 and 15 to carry the tailings forwardly along the sieves until they drop from the forward edges thereof down onto a pivotally adjustable deflector vane or pan 21 which, in the full-line position shown, delivers them to the cylinder 6 to be rethreshed, or, in the dotted-line position, to the top of the mass of straw on the rack 10, if rethreshing is not desired. The baffle 21 provides a very convenient means for returning the tailings to the cylinder or not, as desired. In threshing beans, it is commonly not advisable to risk passing any of them through the cylinder a second time. Consequently, the baffle 21 would be set in the dotted position and the tailings would not be returned to the cylinder. The sieves 15 and 16 are shaken by means of a pitman 21ᵃ connected at one end to the sieve frame and at the other end to a crank on the shaft of the fan 20. The threshed grain delivered to the sieves 15 and 16 drops through the sieves onto a downwardly and rearwardly inclined pan 22 and is delivered therefrom to a transversely extending screw conveyor 23 (Fig. 2) or 23' (Fig. 4) which extends across the combine casing 24 (Fig. 3) or 24' (Fig. 4) and over the tractor A to the grain storage bin C. The air from the fan 20, after passing upwardly and forwardly through and beneath the sieves 15 and 16 is deflected downwardly and rearwardly by the casing 24 and travels rearwardly over the straw rack 10, assisting the rearward movement of the material on the rack.

The cutting and delivering apparatus comprises a sickle 25 extending across in front of the tractor A, a reel 26 for urging the standing grain toward the sickle, an auger conveyor 27 for receiving the cut grain and feeding it transversely from both sides over in front of the threshing apparatus, an endless rake conveyor 7 travelling in the direction of the arrow J to which the auger 27 delivers the cut grain, and an inclined chute 28 in which this conveyor operates, the conveyor 7 delivering the cut grain to the threshing cylinder 6. The sickle 25 is long enough to cut a swath at least as wide as the transverse span of the tractor so that in opening up a field the combine will not mash down any standing grain.

The tractor A shown is a general utility tractor in common use. The casing 24 which houses the threshing apparatus is so designed that it can be readily attached and detached with respect to this type of tractor. The tractor is provided adjacent the lower part of the front end of the motor with a pair of clamps 30, one on each side, cooperating with the adjacent part of the tractor to form rectangular openings in which may be mounted a tubular rectangular crossbar 31. This crossbar is used for various purposes, such as for the attachment of cultivators, or the like. Use is made of these clamps to hold in place a crossbar 31 (Figs. 1, 2 and 7) to which the sills 32 at the front end of the combine are secured by means of U-shaped clamping bolts 33 (Fig. 2). The sills 32 at the rear end of the combine may rest on and be secured to a horizontal platform 34 (Figs. 3 and 4) which may serve as a platform for the operator. With this provision, it will be seen that the combine casing 24 can be readily attached and detached with respect to the tractor.

In order to provide space between the driving wheel of the tractor and the motor, steering wheel, seat, etc., to receive the casing 24 of the combine, use may be made of a hub extension 40 (Figs. 3, 4, 5 and 6) and a reversible drive wheel 1 which will offset the drive wheel 1 sufficiently to accommodate the casing.

The drive axle 36, extending from the differential 37 of the tractor, is provided with an attaching flange 39 to which the drive wheel 1 may be secured directly in either an outsetting or an insetting position or, as an alternative, to which a hub extension 40 may be secured, interposed between the drive axle 36 and the drive wheel 1, to give the desired offset to the drive wheel, which will enable the installation of the combine casing 24 inside the drive wheel. These features are old and well known and are shown in the patents to Johnson No. 1,606,077 and Hendrickson and Nelson No. 1,822,093. It will be seen that both the outsetting of the drive wheel and the interposition of the hub extension add to the offset of the drive wheel.

In the construction shown in Fig. 3, a relatively short hub extension 40 is provided between the drive axle and the drive wheel. In the construction shown in Fig. 4, a longer hub extension 40 is provided on the right-hand side than on the left, in order to provide ample clearance for the installation of the combine casing 24.

With this construction, by a proper choice of length for the hub extension, the desired space may be obtained for the installation of the casing 24 and also of the grain bin C in the space on the inside of the drive wheels.

The beater 9, the crank 10ᵃ, which drives the straw rack 10, the screw conveyor 23, and the sprocket wheels 48 over which the upper end of the chains for the rake conveyor 7 pass, may be driven by any usual suitable transmission means (not shown). The reel 26 is driven from the shaft on which the lower sprocket wheels 49 for the rake conveyor are mounted, by means of a sprocket 50 mounted on the shaft on which the wheels 49 are mounted, a chain 51 engaging this sprocket, a sprocket wheel 52 over which the upper end of this chain passes, a sprocket 53 rotatable with this sprocket wheel, a chain 54 driven from this sprocket, and a sprocket wheel 55 driven by this chain mounted on the shaft of the reel 26. The auger conveyor 27 is driven from a sprocket 56 rotatable with the lower wheels 49, a chain 57 passing over this sprocket, and a sprocket 58 driven from this chain mounted on the auger conveyor shaft. The endless conveyor 13, the screw conveyor 17, the elevator 18, and the screw conveyor 19 may be driven from a motor driven sprocket 59 by means of a chain 60 passing over this sprocket 59 and driving a sprocket 61 on the shaft which drives the conveyor 13 and a sprocket 62 mounted on the shaft of the screw conveyor 17. The fan 20 may be driven by any suitable usual means (not shown), and the sieves 15 and 16 may be driven from this fan 20 by means of pitman 21ª pivotally secured to the sieve frame at one end and pivotally secured at the other end to a crank 64 on the fan shaft.

By the use of the single elevator 18 to raise both the material passing through the concave 8 and the material carried forward by the lower run of the conveyor 18 to deliver it to the sieves 15 and 16 at an elevation higher than the cylinder, the use of the usual two elevators, one for delivering clean grain and one for delivering the tailings, etc., to be rethreshed, is avoided.

Further modifications will be apparent to those skilled in the art and it is desired, therefore, that the invention be limited only by the scope of the appended claims.

Having thus described my invention, what I claim and desire to secure by Letters Patent is:

1. A tractor mounted combine apparatus comprising a tractor, a thresher, and a grain bin, both mounted on said tractor, said tractor comprising a pair of rear drive wheels, dirigible front wheel means, and an engine located medially of the tractor, said thresher comprising a casing extending longitudinally of the tractor between one of the drive wheels and the engine, and threshing apparatus in general mounted in said casing, said grain bin extending between the generally vertical planes of the other drive wheel and the engine, said thresher having grain cutting and conveying apparatus extending transversely of the tractor in front of the dirigible wheel means for cutting the grain and conveying it laterally to be fed to the threshing apparatus, and conveyor means extending transversely of the tractor for conveying the grain from the threshing apparatus in the casing to the grain bin, said cutting apparatus being long enough to cut a swath wide enough to accommodate the driving wheels and dirigible wheel means.

2. A tractor mounted combine apparatus comprising a tractor, a thresher, and a grain bin, both mounted on said tractor, said tractor comprising a pair of rear drive wheels, dirigible front wheel means, and an engine located medially of the tractor, said thresher comprising a casing extending longitudinally of the tractor between one of the drive wheels and the engine, and threshing apparatus in general mounted in said casing, said grain bin extending between the generally vertical planes of the other drive wheel and the engine, said thresher having grain cutting and conveying apparatus extending transversely of the tractor for cutting the grain and conveying it laterally to be fed to the threshing apparatus, said threshing apparatus comprising a rotatable cylinder, a concave co-operating therewith, a rotatable beater for receiving and directing the material thrown off by the cylinder, a rockable straw rack in the rear of said beater for receiving the material from the beater and further separating the material, the straw passing above the rack, and the broken straw and heads falling through the rack, a conveyor to which the material passing through the concave and the material falling through the rack are delivered for conveying the material transversely, an elevator to which this material is delivered, a chaffer and cleaning sieve apparatus, a conveyor for receiving the material from the elevator and distributing it over the rear end of the chaffer sieve, a cleaning fan at the rear of the chaffer and cleaning sieve apparatus for forcing air forwardly and upwardly through said sieves, the chaff and tailings being delivered from the front end of the sieve apparatus, the chaff passing to the straw rack and the tailings passing to the cylinder to be rethreshed, a grain pan underneath the sieves to receive the grain from the sieve apparatus, and a conveyor for transferring the grain from said pan to the grain bin.

3. In a combine, a threshing apparatus comprising a rotatable cylinder, a concave, co-operating therewith, a rotatable beater for receiving and directing the material thrown off by the cylinder, an oscillatable straw rack in the rear of said beater for receiving the material from the beater and further separating the material, the straw passing rearwardly above the rack and the broken straw and heads falling through the rack, an endless raddle conveyor underneath the straw rack for receiving the material falling therethrough, the upper run of the conveyor travelling rearwardly to deliver the unbroken straw, the lower run of the conveyor carrying forwardly the broken straw and heads which pass through the upper run, a conveyor to which the material passing through the concave and the material from the lower run of the endless conveyor are delivered for conveying the material transversely, an elevator to which this material is delivered, a chaffer and cleaning sieve apparatus, a conveyor for receiving the material from the elevator and distributing it over the rear end of the chaffer sieve, a cleaning fan at the rear of the chaffer and cleaning sieve apparatus for forcing air forwardly and upwardly through said sieves, the chaff and tailings being delivered from the sieve apparatus, the chaff passing to the straw rack and the tailings passing to the cylinder to be rethreshed, and a grain pan underneath the sieves to receive the grain from the sieve apparatus.

4. In a combine, a threshing apparatus comprising a rotatable cylinder, a concave co-operating therewith, a rotatable beater for receiving and directing the material which does not pass through the concave and is thrown off by the cylinder, an oscillatable straw rack in the rear of said beater for receiving the material from the beater and further separating the material, the straw passing rearwardly above the rack and the broken straw and heads falling through the rack, an endless raddle conveyor underneath the straw rack for receiving the material falling therethrough, the upper run of the conveyor travelling rearwardly to deliver the unbroken straw, the lower run of the conveyor carrying forwardly the broken straw and heads which pass through the upper run, a chaffer and cleaning sieve apparatus, conveyor means to which the material passing through the concave and the material from the lower run of the endless conveyor are delivered for delivering the material to the chaffer sieve, and a cleaning fan for forcing air through said sieves, the chaff and tailings being delivered from the front end of the sieve apparatus, the chaff passing to the straw rack and the tailings passing to the cylinder to be rethreshed.

5. A tractor mounted combine apparatus comprising a tractor, a thresher, and a grain bin, both mounted on said tractor, said tractor comprising a pair of rear drive wheels, dirigible front wheel means, and an engine located medially of the tractor, said thresher comprising a casing extending longitudinally of the tractor between one of the drive wheels and the engine, and threshing apparatus in general mounted in or on said casing, said grain bin extending between the general vertical planes of the other drive wheel and the engine, said thresher having grain cutting and conveying apparatus extending transversely of the tractor in front of the dirigible wheels means for cutting the grain and conveying it laterally to be fed to the threshing apparatus, and conveyor means extending transversely of the tractor for conveying the grain from the threshing apparatus in the casing to the grain bin, said tractor comprising a differential transmission and a pair of axles extending in opposite directions from said differential and driven thereby for driving the drive wheels, a hub extension connectible and disconnectible with respect both to the axle and the drive wheel on the combine casing side whereby the wheels of an all-purpose tractor may be offset sufficiently to provide clearance for the installation of the combine casing, said cutting apparatus being long enough to cut a swath wide enough to accommodate the drive wheels and dirigible wheel means.

6. A tractor mounted combine appartus comprising a tractor and a thresher mounted on said tractor, said tractor comprising a pair of rear drive wheels, dirigible front wheel means, and an engine located medially of the tractor, said thresher comprising a casing extending longitudinally of the tractor between one of the drive wheels and the engine, and threshing apparatus in general mounted in or on said casing, said thresher having grain cutting and conveying apparatus extending transversely of the tractor in front of the dirigible wheel means for cutting the grain and conveying it laterally to be fed to the threshing apparatus, and a horizontal transversely extending cross beam extending laterally from and secured to the lower front end of the tractor, to which beam the lower front end of said casing is secured.

7. A tractor mounted combine apparatus comprising a tractor and a thresher mounted on said tractor, said tractor comprising a pair of rear drive wheels, dirigible front wheel means, and an engine located medially of the tractor, said thresher comprising a casing extending longitudinally of the tractor between one of the drive wheels and the engine, and threshing apparatus in general mounted in or on said casing, said thresher having grain cutting and conveying apparatus extending transversely of the tractor in front of the dirigible wheel, means for cutting the grain and conveying it laterally to be fed to the threshing apparatus, and a horizontal transversely extending cross beam extending laterally from and secured to the lower front end of the tractor, said casing having longitudinally extending sill means secured to said cross beam for supporting the front end of the casing.

8. A tractor mounted combine apparatus comprising a tractor, a thresher, and a grain bin, both mounted on said tractor, said tractor comprising a pair of rear drive wheels, dirigible front wheel means, and an engine located medially of the tractor, said thresher comprising a casing extending longitudinally of the tractor between one of the drive wheels and the engine, and threshing apparatus in general mounted in or on said casing, said grain bin extending between the general vertical planes of the other drive wheel and the engine, said thresher having grain cutting and conveying apparatus extending transversely of the tractor in front of the dirigible wheel means for cutting the grain and conveying it laterally to be fed to the threshing apparatus, and conveyor means extending transversely of the tractor for conveying the grain from the threshing apparatus in the casing to the grain bin, said cutting apparatus being long enough to cut a swath wide enough to accommodate the drive wheels and dirigible wheel means.

9. A tractor mounted combine apparatus comprising a tractor, a thresher, and a grain bin, both mounted on said tractor, said tractor comprising a pair of rear drive wheels, dirigible front wheel means, and an engine located medially of the tractor, said thresher comprising a casing extending longitudinally of the tractor between the drive wheels, and threshing apparatus in general mounted in said casing, said grain bin extending between the general planes of the drive wheels alongside said casing, said thresher having grain cutting and conveying apparatus extending transversely of the tractor in front of the dirigible wheel means and the drive wheels for cutting the grain and conveying it laterally to be fed to the threshing apparatus, and conveyor means extending transversely of the tractor for conveying the grain from the threshing apparatus in the casing to the grain bin, said grain cutting apparatus extending transversely far enough to cut a swath at least as wide as the transverse span of the drive wheels to enable the initial swath to be cut without trampling the grain.

10. In a combine, a threshing apparatus comprising a rotatable cylinder, a concave co-operating therewith, a rotatable beater for receiving and directing the material thrown off by the cylinder, an oscillatable straw rack in the rear of said beater for receiving the material from the beater and further separating the material, the straw passing rearwardly above the rack and the broken straw and heads falling through the rack, an endless raddle conveyor underneath the straw rack for receiving the material falling therethrough, the upper run of the conveyor travelling rearwardly to deliver the unbroken straw, the lower run of the conveyor carrying forwardly the broken straw and heads which pass through the upper run, a conveyor to which the material passing through the concave and the material from the lower run of the endless conveyor are delivered for conveying the material transversely, an elevator to which this material is delivered, and recleaning screening apparatus for receiving the material from the elevator and separating the broken straw and heads from the clean grain and delivering them to the cylinder to be rethreshed.

11. In a combine, a threshing apparatus comprising a rotatable cylinder, a concave co-operating therewith, a rotatable beater for receiving and directing the material which does not pass through the concave and is thrown off by the cylinder, an oscillatable straw rack in the rear of said beater for receiving the material from the beater and further separating the material, the straw passing rearwardly above the rack and the broken straw and heads falling through the rack, an endless raddle conveyor underneath the straw rack for receiving the material falling therethrough, the upper run of the conveyor travelling rearwardly to deliver the unbroken straw, the lower run of the conveyor carrying forwardly the broken straw and heads which pass through the upper run, conveyor means to which the material passing through the concave and the material from the lower run of the endless conveyor are delivered, and recleaning screening apparatus for receiving the material from said conveyor means and separating the broken straw and heads from the clean grain and delivering them to the cylinder to be rethreshed.

SHERMAN C. HETH.

REFERENCES CITED

The following references are of record in the file of this patent:

UNITED STATES PATENTS

| Number | Name | Date |
| --- | --- | --- |
| 720,699 | King | Feb. 17, 1903 |
| 803,458 | Zollinger | Oct. 31, 1905 |
| 811,025 | Baker | Jan. 30, 1906 |
| 1,781,198 | Scranton, Jr. | Nov. 11, 1930 |
| 1,808,785 | Paradise et al. | June 9, 1931 |
| 2,005,212 | Wickersham | June 18, 1935 |
| 2,017,755 | Hyman | Oct. 15, 1935 |
| 2,129,452 | Van Sickle | Sept. 6, 1938 |
| 2,292,650 | Oehler et al. | Aug. 11, 1942 |
| 2,455,905 | Ronning et al. | Dec. 7, 1948 |

OTHER REFERENCES

New All Crop Harvester, Publication by Allis-Chalmers, Milwaukee, Wis. Received in Patent Office February 8, 1938. (Copy in Division 25.)